United States Patent
Havlir et al.

(10) Patent No.: US 9,508,112 B2
(45) Date of Patent: Nov. 29, 2016

(54) MULTI-THREADED GPU PIPELINE

(71) Applicant: Apple Inc., Cupertino, CA (US)

(72) Inventors: Andrew M. Havlir, Austin, TX (US);
James S. Blomgren, Austin, TX (US);
Terence M. Potter, Austin, TX (US)

(73) Assignee: Apple Inc., Cupertino, CA (US)

( * ) Notice: Subject to any disclaimer, the term of this patent is extended or adjusted under 35 U.S.C. 154(b) by 677 days.

(21) Appl. No.: 13/956,299

(22) Filed: Jul. 31, 2013

(65) Prior Publication Data

US 2015/0035841 A1 Feb. 5, 2015

(51) Int. Cl.
*G06T 1/20* (2006.01)
*G06T 1/60* (2006.01)
*G06F 9/30* (2006.01)
*G06F 9/38* (2006.01)

(52) U.S. Cl.
CPC .............. *G06T 1/20* (2013.01); *G06F 9/3012* (2013.01); *G06F 9/30138* (2013.01); *G06F 9/3826* (2013.01); *G06F 9/3851* (2013.01); *G06F 9/3867* (2013.01); *G06F 9/3873* (2013.01); *G06T 1/60* (2013.01)

(58) Field of Classification Search
None
See application file for complete search history.

(56) References Cited

U.S. PATENT DOCUMENTS

| | | | |
|---|---|---|---|
| 5,717,896 A | 2/1998 | Yung et al. | |
| 7,234,044 B1 | 6/2007 | Perry | |
| 7,426,630 B1 | 9/2008 | Chong et al. | |
| 7,626,521 B2 | 12/2009 | Hussain et al. | |
| 7,761,688 B1 | 7/2010 | Park | |
| 7,834,881 B2 * | 11/2010 | Liu | G06F 9/3012 345/505 |
| 8,103,888 B2 | 1/2012 | Petrick | |
| 8,601,485 B2 * | 12/2013 | Engh-Halstvedt | G06F 9/4881 345/418 |
| 2004/0034759 A1 | 2/2004 | Katzman et al. | |
| 2004/0073779 A1 | 4/2004 | Hokenek et al. | |
| 2005/0289299 A1 | 12/2005 | Nunamaker et al. | |
| 2014/0240337 A1 * | 8/2014 | Lindholm | G09G 5/06 345/582 |
| 2014/0285500 A1 * | 9/2014 | Lindholm | G06T 1/20 345/506 |

FOREIGN PATENT DOCUMENTS

TW 200709051 3/2007

OTHER PUBLICATIONS

Office Action in Taiwanese Application No. 103126275 mailed Oct. 7, 2015, 6 pages.
International Preliminary Report in PCT Application No. PCT/US2014/046830 mailed Feb. 2, 2016, 10 pages.
(Continued)

*Primary Examiner* — Jacinta M Crawford
(74) *Attorney, Agent, or Firm* — Meyertons, Hood, Kivlin, Kowert & Goetzel, P.C.

(57) ABSTRACT

Techniques are disclosed relating to a multithreaded execution pipeline. In some embodiments, an apparatus is configured to assign a number of threads to an execution pipeline that is an integer multiple of a minimum number of cycles that an execution unit is configured to use to generate an execution result from a given set of input operands. In one embodiment, the apparatus is configured to require strict ordering of the threads. In one embodiment, the apparatus is configured so that the same thread access (e.g., reads and writes) a register file in a given cycle. In one embodiment, the apparatus is configured so that the same thread does not write back an operand and a result to an operand cache in a given cycle.

20 Claims, 5 Drawing Sheets

(56) References Cited

OTHER PUBLICATIONS

Ju-Ho Sohn, et al., "A Programmable Vertex Shader with Fixed-Point SIMD Datapath for Low Power Wireless Applications," Graphics Hardware, 2004, 8 pages.

International Search Report and Written Opinion in PCT Application No. PCT/US2014/046830 mailed Sep. 29, 2014, 15 pages.

Wilson, et al., "Dynamic Warp Formation: Efficient MIMD Control Flow on SIMD Graphics Hardware," ACM Transactions on Architecture and Code Optimizations, vol. 6, No. 2, Article 7, publication date Jun. 2009, XP055010433, 38 pages.

Tullsen, et al., "Exploiting Choice: Instruction Fetch and Issue on an Implementable Simultaneous Multithreading Processor," Proceedings of the 23rd Annual Symposium on Computer Architecture, May 22-24, 1996, XP010868081, pp. 191-202.

* cited by examiner

MULTI-THREADED GPU PIPELINE

BACKGROUND

Technical Field

This disclosure relates generally to computer processing and more specifically to a multi-threaded execution pipeline.

Description of the Related Art

Graphics processing units (GPUs) typically operate on large amounts of graphics data in parallel using multiple execution pipelines or shaders. Modern GPUs are becoming more and more programmable, with less computation done in fixed-function hardware and more computation done using programmable shaders that execute graphics instructions from application developers. Execution of such instructions may consume considerable power, especially in more powerful GPUs. This may be problematic in mobile graphics applications where a battery is a power source.

SUMMARY

Techniques are disclosed relating to a multithreaded execution pipeline. In some embodiments, an apparatus is configured to assign a number of threads to an execution pipeline that is an integer multiple of a minimum number of cycles that an execution unit is configured to use to generate an execution result from a given set of input operands. In one embodiment, the apparatus is configured to require strict ordering of the threads, in which a thread must release an instruction or a NOP each time it reaches its turn in the strict ordering. This strict ordering may lead to fixed relationships between pipeline stages, which may reduce dependency checking logic and thus reduce complexity and/or power consumption.

In one embodiment, the apparatus is configured such that only one thread accesses (e.g., reads and/or writes) a register file in a given cycle, which may allow a compiler to reduce bank clashes in the register file, for example.

In one embodiment, the apparatus is configured such that the same thread does not write more than one operand to an operand cache in a given cycle. This may allow implementations with single-ported operand caches.

In one embodiment, the apparatus is configured to forward a result of a first instruction as an operand for a subsequent instruction from the same thread as the first instruction. This may reduce waiting by threads for operands.

In one embodiment, the apparatus is configured to stall one thread in the strict ordering of threads while allowing execution of other threads in the ordering to continue. In one embodiment, the apparatus is configured to broadcast a stall to only pipeline stages processing the one thread. This may allow more efficient thread execution and/or reduce complexity in circuitry used to broadcast stall indications.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112(f) for that unit/circuit/component.

DETAILED DESCRIPTION

Figure 1A:
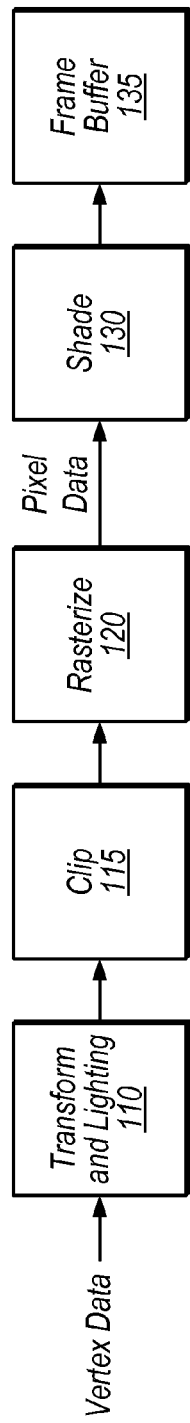
FIG. 1A is a block diagram illustrating an exemplary graphics processing flow.
Figure 1B:
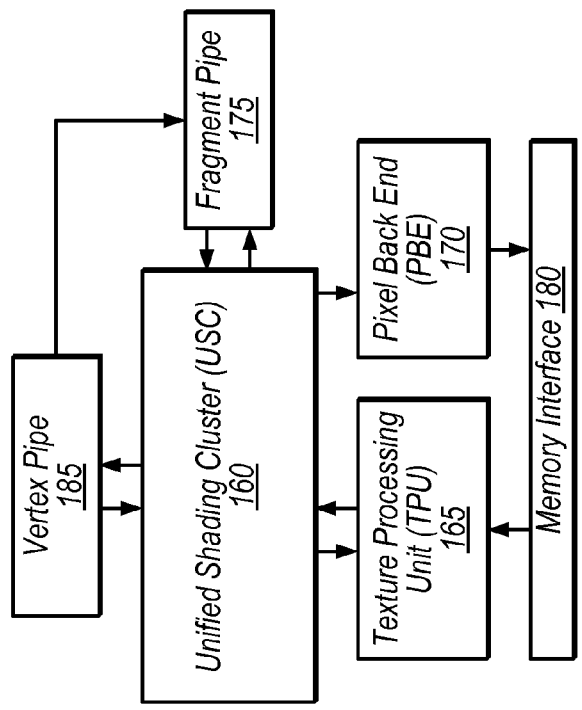
FIG. 1B is a block diagram illustrating one embodiment of a graphics unit.

This disclosure initially describes, with reference to FIGS. 1A-B, an overview of a graphics processing flow and an exemplary graphics unit. Embodiments of graphics pipelines are described in further details with references to FIGS. 2-4 and an exemplary device is described with reference to FIG. 5. In some embodiments, graphics pipeline implementations may reduce power consumption and/or improve performance in execution of graphics instructions.

Referring to FIG. 1A, a flow diagram illustrating an exemplary processing flow 100 for processing graphics data is shown. In one embodiment, transform and lighting step 110 may involve processing lighting information for vertices received from an application based on defined light source locations, reflectance, etc., assembling the vertices into polygons (e.g., triangles), and/or transforming the polygons to the correct size and orientation based on position in a three-dimensional space. Clip step 115 may involve discarding polygons or vertices that fall outside of a viewable area. Rasterize step 120 may involve defining fragments or pixels within each polygon and assigning initial color values for each fragment, e.g., based on texture coordinates of the vertices of the polygon. Shade step 130 may involve altering pixel components based on lighting, shadows, bump mapping, translucency, etc. Shaded pixels may be assembled in a frame buffer 135. Modern GPUs typically include programmable shaders that allow customization of shading and other processing steps by application developers. Thus, in various embodiments, the exemplary steps of FIG. 1A may be performed in various orders, performed in parallel, or omitted, and additional processing steps may be implemented.

Referring now to FIG. 1B, a simplified block diagram illustrating one embodiment of a graphics unit 150 is shown. In the illustrated embodiment, graphics unit 150 includes unified shading cluster (USC) 160, vertex pipe 185, fragment pipe 175, texture processing unit (TPU) 165, pixel back end (PBE) 170, and memory interface 180. In one embodiment, graphics unit 150 may be configured to process both vertex and fragment data using USC 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with USC 160 in order to coordinate vertex processing. In the illustrated embodiment, vertex pipe 185 is configured to send processed data to fragment pipe 175 and/or USC 160 for further processing.

Fragment pipe 175, in the illustrated embodiment, may include various fixed-function hardware configured to process pixel data. Fragment pipe 175 may be configured to communicate with USC 160 in order to coordinate fragment processing. Fragment pipe 175 may be configured to perform rasterization on polygons from vertex pipe 185 and/or USC 160 to generate fragment data. Vertex pipe 185 and/or fragment pipe 175 may be coupled to memory interface 180 (coupling not shown) in order to access graphics data.

USC 160, in the illustrated embodiment, is configured to receive vertex data from vertex pipe 185 and fragment data from fragment pipe 175 and/or TPU 165. USC 160 may be configured to perform vertex processing tasks on vertex data which may include various transformations and/or adjustments of vertex data. USC 160, in the illustrated embodiment, is also configured to perform fragment processing tasks on pixel data such as texturing and shading, for example. USC 160 may include multiple execution instances for processing data in parallel. USC 160 may be referred to as "unified" in the illustrated embodiment in the sense that it is configured to process both vertex and fragment data. In other embodiments, programmable shaders may be configured to process only vertex data or only fragment data.

TPU 165, in the illustrated embodiment, is configured to schedule fragment processing tasks from USC 160. In one embodiment, TPU 165 may be configured to pre-fetch texture data and assign initial colors to fragments for further processing by USC 160 (e.g., via memory interface 180). TPU 165 may be configured to provide fragment components in normalized integer formats or floating-point formats, for example. In one embodiment, TPU 165 may be configured to provide fragments in groups of four (a "fragment quad") in a 2×2 format to be processed by a group of four execution instances in USC 160.

PBE 170, in the illustrated embodiment, is configured to store processed tiles of an image and may perform final operations to a rendered image before it is transferred to a frame buffer (e.g., in a system memory via memory interface 180). Memory interface 180 may facilitate communications with one or more of various memory hierarchies in various embodiments.

In various embodiments, a programmable shader such as USC 160 may be coupled in any of various appropriate configurations to other programmable and/or fixed-function elements in a graphics unit. The exemplary embodiment of FIG. 1B shows one possible configuration of a graphics unit 150 for illustrative purposes.

Figure 2:
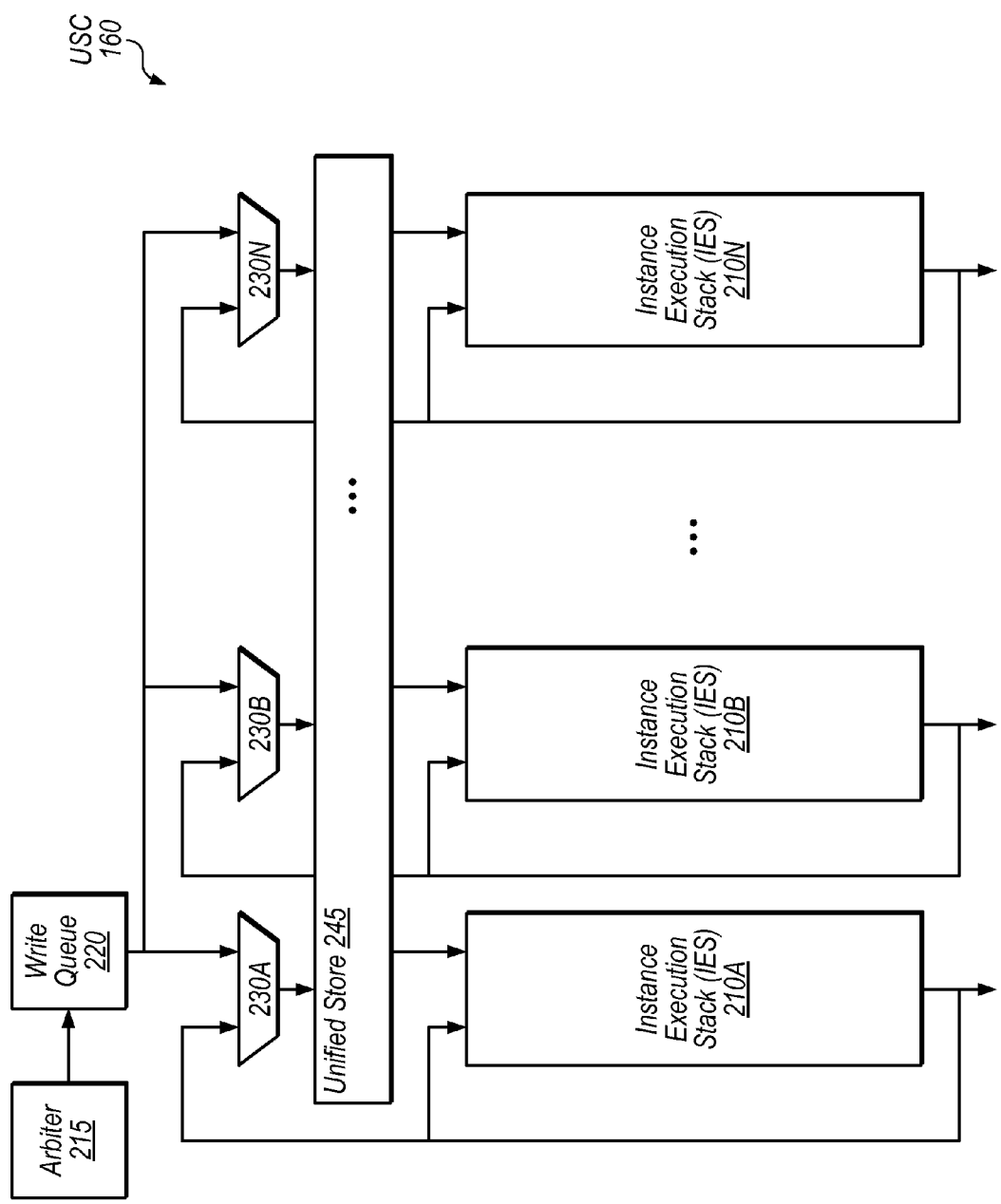
FIG. 2 is a block diagram illustrating one embodiment of a unified shading cluster.

Referring now to FIG. 2, a block diagram illustrating one embodiment of USC 160 is shown. In the illustrated embodiment, USC 160 includes arbiter 215, write queue 220, MUXs 230A-N, unified store 245, and instance execution stacks (IESs) 210A-N. In one embodiment, USC 160 is configured to execute graphics instructions in parallel using IESs 210.

Arbiter 215, in one embodiment, is configured to determine which of a number of agents is allowed to write to write queue 220 in a given cycle. Non-limiting examples of agents include a memory controller unit, TPU 165, or an iterator. Write queue 220, in one embodiment, is configured to store information to be written to unified store 245 and write the stored data to unified store 245 without conflicting with writes by IESs 210A-N. MUXs 230A-N may control write access to unified store 245 and may be configured to give priority to IESs 210A-N.

IESs 210A-N, in some embodiments, may each include an execution unit or arithmetic logic unit (ALU) that includes floating-point units, integer units, shift units, etc. IESs may also be referred to as "shaders," "shader pipelines," or "graphics pipelines" and may each include one or more execution pipelines. USC 160, in various embodiments, may include any number of IESs 210, such as 16, 128, 1024, etc. IESs 210A-N may be configured to read source operands from unified store 245. IESs 210A-N may be configured to write execution results to unified store 245 and/or internally forward results back as operands for subsequent instructions. IESs 210A-N, in some embodiments, include operand cache storage to cache results and/or source operands from unified store 245. Operand caches may reduce power consumption used in reading operands. IESs 210A-N may be configured to operate on multiple threads in parallel. In one embodiment, USC 160 is configured to process the same instruction in a given cycle for all of IESs 210. IESs 210A-N, in one embodiment, may be arranged in 2×2 groups of four.

Unified store 245 may be implemented using any of various appropriate storage structures. Unified store 245, in one embodiment, may include a hundred registers or more for each IES 210, which may be distributed across multiple banks. In one embodiment, each of these banks may be separately accessed. In one embodiment, each bank of unified store 245 includes registers for multiple IESs 210. This may reduce register file access conflicts between IESs 210 because each bank read may provide data for multiple IESs, while different registers on different banks may be accessed in the same cycle. In other embodiments, unified store 245 may not be split into multiple banks, but may include multiple read ports. However, splitting unified store 245 into multiple banks may reduce power consumption compared to implementing a multi-ported storage element. TPU 165 may be configured to store fragment components in unified store 245 prior to scheduling shader operations on the fragment components. Unified store 245, in one embodiment, is also configured to store vertex data. Unified store 245 may also be referred to as a "register file."

Each IES 210 may be configured to process multiple threads at a time, e.g., in order to avoid stalling while waiting for an execution unit. This multi-threaded configuration may allow for greater power efficiency and/or performance advantages in some embodiments.

Exemplary Processing Pipeline

Figure 3:
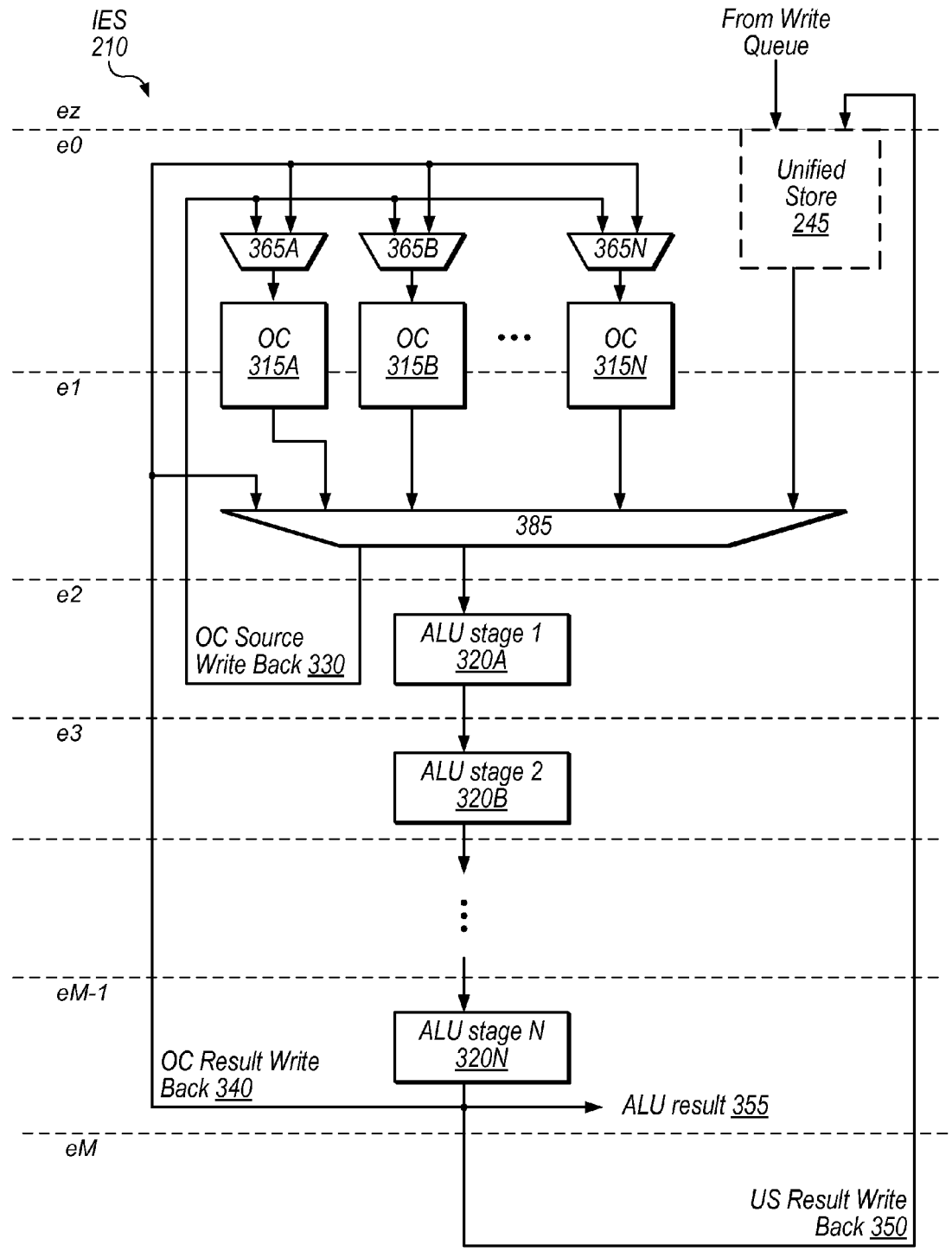
FIG. 3 is a block diagram illustrating one embodiment of an execution pipeline.

Referring now to FIG. 3, a block diagram illustrating one embodiment of an IES 210 is shown. IES 210 may also be referred to as a shader pipeline or an execution pipeline. In the illustrated embodiment, IES 210 includes operand caches 315A-N, MUXs 365A-N and 385, and ALU stages 320A-N. In the illustrated embodiment, unified store 245 is shown using dashed lines to indicate that unified store 245 may not be considered part of IES 210. In the illustrated embodiment, the horizontal dashed lines mark boundaries between pipeline stages, and one or more storage elements such as latches may be used to store data between stages. Thus, for example, in the illustrated embodiment, stage "e1" is adjacent to stages "e0" and "e2".

As used herein, the term "pipeline" includes its well-understood meaning in the art, which includes a sequence of processor elements where the output of one element is the input of a next element, and the elements each perform different functionality for a given operation (e.g., as specified by an instruction). Instruction decode, dispatch, execution, and retirement are just some (non-limiting) examples of different instruction pipeline stages. In the illustrated embodiment, USC 160 may be configured to perform fetch and decode operations for graphics instructions and provide operands to IESs 210 for further processing. Pipelines in IESs 210 may be referred to as "execution pipelines" and may perform various operations on provided operands from USC 160. As used herein, the term "execution pipeline" may refer to a portion of a pipeline or an entire pipeline and includes at least an execution unit.

Various pipeline architectures are contemplated with varying numbers and orderings of stages/elements/portions. In one embodiment, each pipeline stage performs a particular function during a single clock cycle, then passes data on to another stage.

IES 210, in some embodiments, is configured to execute graphics operations using ALU 320. ALU 320 may include a floating-point unit and a complex unit, for example, along with any of various additional functional blocks. In the illustrated embodiment, ALU 320 is configured to perform operations over at least N cycles and includes at least N pipeline stages (ALU 320 may include additional pipeline stages that are not shown). ALU result 355 may be usable by other processing elements (not shown) at pipeline stage eM−1.

Operand caches 315A-N, in the illustrated embodiment, are configured to cache source operands from unified store 245 (e.g. via OC source write back 330) and/or results from ALU stage N (e.g. via OC result write back 340). MUXs 365A-N, in the illustrated embodiment, are configured to select between these inputs to each operand cache 315. Caching sources and results may improve performance and/or decrease power consumption compared to accessing data from unified store 245. In one embodiment, each operand cache 315 is configured to maintain cache information such as tag state, valid state, and replacement state and may compute hits and misses. In other embodiments, this cache information is maintained by a centralized control unit of USC 160 for multiple instances at a time. In still other embodiments, operand caches 315 may be implemented as queues rather than caches. The term "operand cache" refers to any storage element configured to store operands for a pipeline. Typically, operand caches are included in an execution pipeline or very close to an execution pipeline. In one embodiment, an operand cache is a lowest-level storage element in cache hierarchy. In one embodiment, an operand cache is located between a register file and an execution pipeline, and is configured to cache operands that have been provided to the execution pipeline by the register file and/or other operand providers.

MUX 385, in the illustrated embodiment, is configured to select and provide operands for ALU stage 1 320A from unified store 245, operand caches 315A-N, and/or OC result write back signal 340. MUX 385 may be configured to provide a number of operands from one or more of these sources to ALU 320, such as three operands, in one embodiment. Unified store 245 may be configured as described above with reference to FIG. 2. In some embodiments, MUX 385 may be configured to receive operands from other IESs or other processing elements (not shown) and may assign such operands to inputs of ALU stage 1 320A.

For the ez stage, in the illustrated embodiment, IES 210 is configured to initiate reads for an instruction from unified store 245, if the instruction requires one or more operands from unified store 245. In this embodiment, IES 210 is also configured to initiate a store of result write back 350 to unified store 245. In some embodiments, if an instruction in the ez stage needs to read a result of an instruction in the eM stage, IES 210 is configured to both write the result from the eM stage to unified store 245 and forward the result to make it available to the instruction in the ez stage. This may avoid the instruction in the ez stage having to access the unified store to get the result. In one embodiment, IES 210 is configured to store the forwarded result from the eM stage in a storage element (not shown) within IES 210 to be used as a source input to ALU 320 when the instruction in the ez stage reaches ALU 320.

For the e0 stage, in the illustrated embodiment, IES 210 is configured to wait for data from unified store 245 and store data in one or more of operand caches 315 (e.g., using source write back 330 and/or result write back 340).

For the e1 stage, in the illustrated embodiment, IES 210 is configured to set up ALU 320 by selecting operands from operand caches 315A-N, unified store 245, and/or other operand sources (not shown). In this embodiment, IES 210 is also configured to provide the operands to sources of ALU 320. In some embodiments, IES 210 may be configured to select operands to write to an operand cache 315 using OC source write back signal 330 and/or an operand to write to unified store 245 from an operand cache 315 (routing not shown).

For the e2 stage, in the illustrated embodiment, IES 210 is configured to begin operating on operands using ALU 320. In this embodiment, IES 210 is also configured to provide an operand using source write back 330 to one of operand caches 315 in stage e2.

For the e3 through eM−1 stages, in the illustrated embodiment, ALU 320 is configured to continue processing operands. For stage eM−1, in the illustrated embodiment, IES 210 is configured to generate OC result write back 340 to be written to an operand cache 315 by stage e0.

For the eM stage, in the illustrated embodiment, IES 210 is configured to provide US result write back 350 to be written to unified store 245 by stage ez.

Pipeline Rules and Advantages

In one embodiment, USC 160 is configured to assign or schedule at least N threads for execution on IES 210 where N is the minimum number of cycles in which ALU 320 is configured to generate an execution result for a given set of input operands. Said another way, ALU 230 is configured to generate a usable execution result using at least N cycles. The N stages of ALU 230 configured to generate this result may be described as a "critical loop." As shown, within a critical loop, each pipeline stage may send its results to a next pipeline stage, and the results are not usable by other processing elements until the last stage of the critical loop. In one embodiment, ALU 230 may be configured to use more than N cycles to generate a result for some operations, and may include stages in addition to those in the critical loop. However, in some embodiments, ALU 230 may be configured to generate results for a large majority of operations performed by ALU 230 in N cycles.

In one embodiment, USC 160 is configured to assign a number of threads that is an integer multiple of N for execution on a pipeline. This may allow threads to continuously execute without stalling while waiting for results from ALU 320. In some embodiments, USC 160 is configured to require strict ordering of threads executing on IES 210. For example, in the illustrated embodiment, the thread reading from unified store 245 in cycle e0 must change every cycle. In the illustrated embodiment, each thread is assigned one of operand caches 315A-N. In the discussion below, it is assumed that N threads are running in a strictly ordered fashion on IES 210. However, configurations in which more than N threads are assigned to a given IES 210 are also contemplated.

As used herein, the phrase "strictly ordering" execution of threads for a given execution pipeline means that, for a set of N threads, a given input or output to a stage within the execution pipeline will be associated with a particular one of the N threads once and only once every N cycles.

For example, consider a situation with N=4 threads and the ordering: T0, T1, T2, T3, T0, T1, T2, T3. In this example, under strict execution ordering of these 4 threads by an execution pipeline, a given stage in that pipeline is associated with thread T0 once and only once every 4 cycles.

To enforce strict ordering, an apparatus may be configured to alternate issuing instructions for threads based on such an ordering. If a thread in a strictly ordered configuration is not ready to issue an instruction (e.g., while waiting for operand data for the instruction because of a bank clash in unified store 245), it may insert a bubble or NOP into the pipeline, but another thread in the pattern cannot take the waiting thread's place without violating strict ordering. Thus, a pipeline stage being "associated" with a thread in a given cycle may correspond to receiving an instruction or a NOP for the thread, for example. Note that a new thread (i.e., a thread not already included in the ordering) may replace a particular thread in a strictly ordered configuration without violating strict ordering, e.g., once the particular thread has finished execution. However, the replacing thread must step into the ordering of the replaced thread without violating the ordering. Thus, if thread T7 replaces T0 in the ordering T0, T1, T2, T3, T0, T1, T2, T3 . . . the new ordering must be T7, T1, T2, T3, T7, T1, T2, T3 . . . to avoid violating strict ordering. In one embodiment, USC 160 is configured to issue, in each of N consecutive cycles, an instruction or NOP from a different thread in order to facilitate strict ordering.

In one embodiment, IES 210 is configured to stall one thread (e.g., while waiting for resolution of a bank clash in unified store 245) while allowing other threads to continue execution. In one embodiment, IES 210 is configured to broadcast information indicating a stall to pipeline stages processing the one thread but not to other pipeline stages. In this embodiment, the pipeline stages configured to receive the broadcast may be configured to store their data rather than passing it onto a next stage, until the stall is ended. Thus, in this embodiment, each pipeline stage may include separate storage for the N threads. In the illustrated embodiment, the pipeline stages that receive the broadcast are fixed. This may reduce complexity of broadcasting pathways and overall pipeline design while improving performance.

The strict ordering rules discussed above and the illustrated pipeline configuration may allow for a number of improvements or optimizations to reduce power consumption and/or increase performance in some embodiments.

First, in the illustrated embodiment, IES 210 is configured such that instructions from the same thread will reside in the ez and eM pipeline stages during a given cycle. Thus, in this embodiment, the same thread that may write to unified store 245 in a given cycle may also read from unified store 245 that cycle (and other threads executing on IES 210 may not access unified store 245 in that cycle). In some embodiments, this may give a compiler (of a given thread) full knowledge of what needs to access unified store 245 each cycle, which may allow the compiler to avoid bank clashes for the thread by reducing situations in which instructions in a given thread access the same bank in unified store 245.

Speaking generally, in some embodiments, only a single thread is allowed to access the register file in a given cycle.

In one embodiment, registers for a given IES 210 may be distributed across multiple banks of unified store 245. In this embodiment, a compiler may attempt to assign result and input registers that are not from the same bank of unified store 245 for adjacent instructions from the same thread. In various embodiments, an older instruction may write a result back to unified store 245 in the same cycle that a younger instruction from the same thread reads a result from unified store 245 when the two instructions are assembled such that they do not access the same bank.

Second, in the illustrated embodiment, IES 210 is configured such that the same thread resides in the e1 and eM−1 pipeline stages during a given cycle. Further, in the illustrated embodiment, the instructions residing in the e1 and eM−1 pipeline stages must be adjacent instructions. In other words, one of the instructions (the "younger" instruction in stage e1) will be immediately subsequent to the other instruction (the "older instruction" in stage eM−1) in program order. This allows forwarding of the result of ALU stage N via OC result write back 340 to MUX 385 for use by the immediately subsequent instruction at stage e1. In the illustrated embodiment, this result write back 340 is first available in the same cycle in which the immediately subsequent instruction receives its operands, which allows the result write back to be forwarded in that cycle, e.g., without having to storing it for any intervening cycles. Thus, in the illustrated embodiment, threads with adjacent dependent instructions do not have to stall while waiting for results from ALU 320, because IES 210 is configured to forward results directly to the next instruction in a given thread.

In some embodiments, IES 210 is configured to forward results backwards a multiple of N pipelines stages. This may simplify forwarding by ensuring that the sending and receiving stages are both processing the same instruction. For example, consider an exemplary embodiment in which N is 3. In this embodiment, OC result write back 340 discussed is provided to a stage (e1) 3 cycles prior, that is processing the same thread. In this embodiment, US result write back 350 is provided to a stage (ez) 6 cycles prior, and 6 is an integer multiple of 3. Similarly, in embodiments in which ALU 320 includes more than N pipeline stages (not shown), results generated by these additional stages may be forwarded backwards a multiple of N stages.

The partitioning of pipeline stages of FIG. 3 may create a fixed relationship between pipeline stages, which, along with strictly ordered execution of threads may simplify dependency checking logic. In embodiments in which threads remain strictly ordered, a given thread occupies a limited set of pipeline stages in IES 210. Thus, the amount of dependency checking logic may be greatly reduced, e.g., because the number of combinations of stages that must be checked against each other for dependencies is reduced. This may reduce power consumption and design complexity in some embodiments.

As used herein, the term "immediately subsequent" refers to a next entity in an ordering scheme that follows immediately after a first entity. Thus an "immediately subsequent instruction" is a next instruction in program order after a given instruction and an "immediately subsequent cycle" is a next clock cycle that occurs just after a given clock cycle. Thus, for a given instruction, another instruction is not immediately subsequent to the given instruction if there are other instructions between the two instructions in program order. The term "program order" refers to an ordering of instructions in computer code, which is potentially from the order which the instructions are executed within a processor. For example, for the program:

load r1, #4
    subtract r1, r1, #1
    store r1, r3 the "store" follows the "subtract" in program order.

Third, in the illustrated embodiment, a given instruction may cause two writes to an operand cache 315. In this embodiment, the first write may occur at stage e2 via OC source write back signal 330 and the second write may occur at stage eM−1 via OC result write back signal 340. In the illustrated embodiment, each operand cache 315 is assigned to a single thread. In the illustrated embodiment, IES 210 is configured such that different threads reside at stages e2 and eM−1 in a given cycle. Thus, in this embodiment, IES 210 is configured such that each operand cache 315 is written at most once per cycle, which allows operand caches 315 to be implemented with a single input port, even though they may be configured to cache both sources and results. Operand caches with a single input port may reduce power consumption in comparison to operand caches with multiple input ports. In the illustrated embodiment, MUXs 365 are located outside operand caches 315 and are configured to select the appropriate input for a single input port of an OC 315 in a given cycle. Thus, MUXs 365 may be controlled based on the pipeline stage at which a thread assigned to a given operand cache 315 currently resides.

The illustrated configuration of IES 210 is intended to be exemplary and non-limiting; in other embodiments, pipeline elements of IES 210 may be rearranged or omitted and additional pipeline elements may be included. In some embodiments, any combination of one or more of the improvements or optimizations described herein may be included and some or all of the improvements or optimizations may be omitted. In other embodiments, any of various appropriate pipeline configurations may be implemented.

Figure 4:
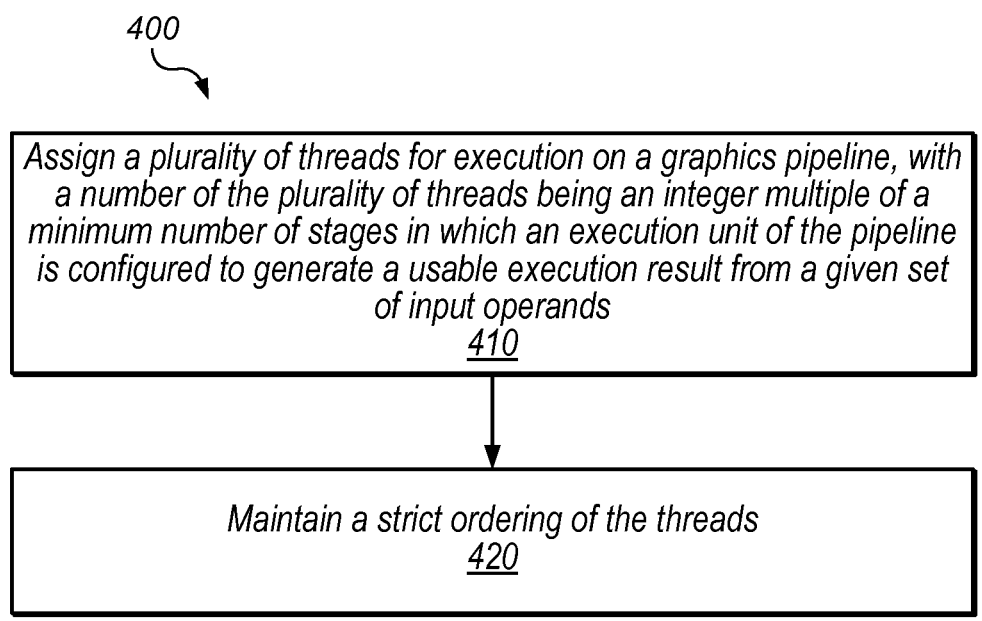
FIG. 4 is a flow diagram illustrating one embodiment of a method for assigning threads to a pipeline.

Referring now to FIG. 4, a flow diagram illustrating one exemplary embodiment of a method 400 for assigning threads to a pipeline is shown. The method shown in FIG. 4 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at block 410.

At block 410, a plurality of threads are assigned for execution on a graphics pipeline. In the illustrated embodiment, a number of the plurality of threads is an integer multiple of a minimum number of stages in which an execution unit of the pipeline is configured to generate a usable execution result from a given set of input operands. For example, if an execution unit is configured to perform operations over N cycles, step 410 may include assigning at least N threads to the pipeline. Flow proceeds to block 420.

At block 420, strict ordering of the threads is maintained. For example, in one embodiment, USC 160 is configured such that threads must either release an instruction or a NOP every N cycles where N is the number of threads assigned to a pipeline. Flow ends at block 420.

In some embodiments, the pipeline configuration may allow a compiler to assign a read from a register file and a write to the register file from a particular thread to different banks of a register file, e.g., because unified store 245 is only accessed by at most one thread each cycle. This may reduce bank clashes in the register file and thus reduce delay and power consumption associated with accessing operands. A compiler may assemble instructions in order to assign reads and/or write in nearby instructions to different banks. The compiler may be configured to attempt to prevent different instructions from accessing the same bank in the same cycle.

In some embodiments, maintaining the strict ordering of the threads ensures that a given thread does not write an operand and a result to an operand cache in a same cycle. This may allow single-ported operand cache implementations in various embodiments, which may reduce power consumption in comparison to embodiments with multi-ported operand caches or embodiments that do not include operand caches.

In some embodiments, a method may include forwarding a result from execution of a first instruction in a given thread as an input operand for an immediately subsequent instruction in the given thread. The method may include providing the input operand at an execution unit in an immediately subsequent clock cycle to the clock cycle in which the result is available.

Figure 5:
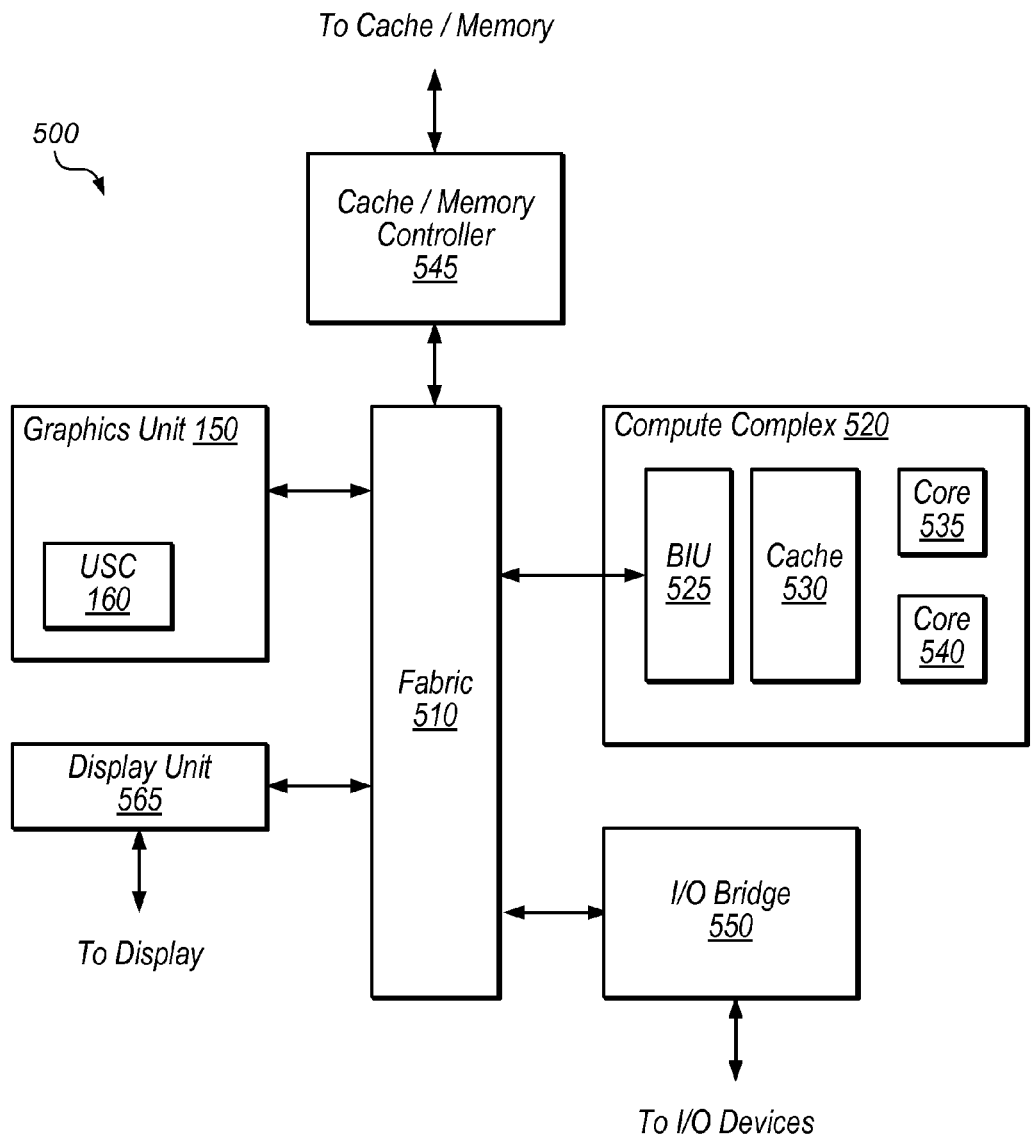
FIG. 5 is a block diagram illustrating one embodiment of a device that includes a graphics unit.

Referring now to FIG. 5, a block diagram illustrating an exemplary embodiment of a device 500 is shown. In some embodiments, elements of device 500 may be included within a system on a chip. In some embodiments, device 500 may be included in a mobile device, which may be battery-powered. Therefore, power consumption by device 500 may be an important design consideration. In the illustrated embodiment, device 500 includes fabric 510, compute complex 520, input/output (I/O) bridge 550, cache/memory controller 545, graphics unit 150, and display unit 565.

Fabric 510 may include various interconnects, buses, MUX's, controllers, etc., and may be configured to facilitate communication between various elements of device 500. In some embodiments, portions of fabric 510 may be configured to implement various different communication protocols. In other embodiments, fabric 510 may implement a single communication protocol and elements coupled to fabric 510 may convert from the single communication protocol to other communication protocols internally.

In the illustrated embodiment, compute complex 520 includes bus interface unit (BIU) 525, cache 530, and cores 535 and 540. In various embodiments, compute complex 520 may include various numbers of cores and/or caches. For example, compute complex 520 may include 1, 2, or 4 processor cores, or any other suitable number. In one embodiment, cache 530 is a set associative L2 cache. In some embodiments, cores 535 and/or 540 may include internal instruction and/or data caches. In some embodiments, a coherency unit (not shown) in fabric 510, cache 530, or elsewhere in device 500 may be configured to maintain coherency between various caches of device 500. BIU 525 may be configured to manage communication between compute complex 520 and other elements of device 500. Processor cores such as cores 535 and 540 may be configured to execute instructions of a particular instruction set architecture (ISA) which may include operating system instructions and user application instructions.

Cache/memory controller 545 may be configured to manage transfer of data between fabric 510 and one or more caches and/or memories. For example, cache/memory controller 545 may be coupled to an L3 cache, which may in turn be coupled to a system memory. In other embodiments, cache/memory controller 545 may be directly coupled to a memory. In some embodiments, cache/memory controller 545 may include one or more internal caches.

As used herein, the term "coupled to" may indicate one or more connections between elements, and a coupling may include intervening elements. For example, in FIG. 5, graphics unit 150 may be described as "coupled to" a memory through fabric 510 and cache/memory controller 545. In contrast, in the illustrated embodiment of FIG. 5, graphics unit 150 is "directly coupled" to fabric 510 because there are no intervening elements.

Graphics unit 150 may be configured as described above with reference to FIGS. 1B, 2, and 3. Graphics unit 150 may include one or more processors and/or one or more graphics processing units (GPU's). Graphics unit 150 may receive graphics-oriented instructions, such OPENGL® or DIRECT3D® instructions, for example. Graphics unit 150 may execute specialized GPU instructions or perform other operations based on the received graphics-oriented instructions. Graphics unit 150 may generally be configured to process large blocks of data in parallel and may build images in a frame buffer for output to a display. Graphics unit 150 may include transform, lighting, triangle, and/or rendering engines in one or more graphics processing pipelines. Graphics unit 150 may output pixel information for display images. In the illustrated embodiment, graphics unit 150 includes USC 160.

Display unit 565 may be configured to read data from a frame buffer and provide a stream of pixel values for display. Display unit 565 may be configured as a display pipeline in some embodiments. Additionally, display unit 565 may be configured to blend multiple frames to produce an output frame. Further, display unit 565 may include one or more interfaces (e.g., MIPI® or embedded display port (eDP)) for coupling to a user display (e.g., a touchscreen or an external display).

I/O bridge 550 may include various elements configured to implement: universal serial bus (USB) communications, security, audio, and/or low-power always-on functionality, for example. I/O bridge 550 may also include interfaces such as pulse-width modulation (PWM), general-purpose input/output (GPIO), serial peripheral interface (SPI), and/or inter-integrated circuit (I2C), for example. Various types of peripherals and devices may be coupled to device 500 via I/O bridge 550.

* * *

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   an execution pipeline that includes an execution unit configured to generate execution results from input operands, wherein, for any given set of input operands, the execution unit is configured to use at least N cycles after receiving input operands to generate a corresponding execution result, wherein N is an integer greater than or equal to 2;
   wherein the apparatus is configured to assign a number of threads M for execution by the execution pipeline, wherein M is an integer multiple of N; and
   wherein the apparatus is configured to strictly order execution of the threads by the execution pipeline, such that an input to a given stage within the execution pipeline is associated with a particular one of the threads once and only once every M cycles during strictly ordered execution of the threads.

2. The apparatus of claim 1,
   wherein the execution pipeline is configured such that a thread in a first pipeline stage in a given cycle is the same as a thread in a second pipeline stage in the given cycle, wherein the first pipeline stage is configured to read data from a register file and wherein the second pipeline stage is configured to write data to the register file.

3. The apparatus of claim 2, wherein the execution pipeline is configured such that only pipeline stages executing a single given thread have access to the register file in a given cycle.

4. The apparatus of claim 3, wherein the configuration of the execution pipeline allows a compiler to avoid bank clashes for instructions of a given thread independent of the bank accesses by the other threads in the execution pipeline.

5. The apparatus of claim 1, further comprising:
   an operand cache; and
   a plurality of pipeline stages configured to write to the operand cache;
   wherein the apparatus is configured to guarantee that threads in the plurality of pipeline stages configured to write to the operand cache are different threads.

6. The apparatus of claim 5, further comprising:
   a circuit located outside of the operand cache and configured to select an input to the circuit in a given cycle and provide the input to the operand cache;
   wherein the operand cache includes at most one write port.

7. The apparatus of claim 1,
   wherein the execution pipeline is configured to forward a result from a first stage of the execution pipeline to a second stage of the execution pipeline, wherein the second stage of the execution pipeline is an integer multiple of N stages prior to the first stage in the execution pipeline.

8. The apparatus of claim 7, wherein the first stage is configured to forward a result of the execution unit and wherein the second stage is configured to access a register file.

9. The apparatus of claim 1, wherein the apparatus is configured to stall one of the number of threads and indicate the stall to pipeline stages operating on the thread, but not indicate the stall to pipeline stages operating on other threads.

10. The apparatus of claim 9, wherein the execution pipeline is configured to continue execution of the other threads while the one of the number of threads is stalled.

11. The apparatus of claim 1, wherein the apparatus is configured to write back a result from the execution unit to an operand cache in a different pipeline stage than the apparatus is configured to write back a result from the execution unit to a register file.

12. A method, comprising:
assigning a plurality of threads for execution on a pipeline, wherein a number M of the plurality threads is an integer multiple of a minimum number of stages in which an execution unit of the pipeline is configured to generate a usable execution result after receiving a given set of input operands; and
maintaining a strict ordering of the plurality of threads, such that an input to a given stage within the pipeline is associated with a particular one of the threads once and only once every M cycles while the strict ordering is maintained.

13. The method of claim 12, further comprising:
allowing only pipeline stages of the pipeline that are associated with a single thread to access a register file in a given cycle.

14. The method of claim 12, further comprising:
receiving first and second instructions for a particular thread, wherein one or more registers for operands for the first instruction do not reside on a same bank of a register file that includes one or more registers for a result of the second instruction.

15. The method of claim 12, further comprising allowing at most one pipeline stage to write to an operand cache for a given thread in a given cycle.

16. The method of claim 12, further comprising:
writing a result to a first operand cache in a given cycle; and
writing an operand to a second operand cache in the given cycle.

17. The method of claim 12, further comprising:
forwarding a result from execution of a first instruction in a given thread as an input operand for a subsequent instruction in the given thread, wherein the first instruction is in a first pipeline stage that is an integer multiple of the minimum number of stages ahead of a second pipeline stage, wherein the subsequent instruction is in the second pipeline stage.

18. The method of claim 17, wherein second pipeline stage is configured to assign operands to a plurality of execution unit inputs.

19. The method of claim 12, further comprising:
stalling one of the threads without broadcasting the stall to pipeline stages operating on other threads.

20. An apparatus, comprising:
a register file;
a plurality of operand caches; and
a graphics pipeline comprising:
an execution unit configured to use at least N cycles to generate a usable execution result, wherein N is an integer greater than or equal to 2;
a first pipeline stage configured to write a source to one of the plurality of operand caches; and
a second pipeline stage configured to write a result to one of the plurality of operand caches;
wherein the apparatus is configured to assign a multiple of N threads at a time to the pipeline for execution;
wherein the apparatus is configured to strictly order execution of the threads;
wherein the pipeline is configured such that a first thread in the first pipeline stage in a given cycle is a different thread than a second thread in a second pipeline stage in the given cycle; and
wherein the one of the plurality of operand caches includes at most one write port.

* * * * *